(12) United States Patent
Nidamanuri et al.

(10) Patent No.: US 12,164,358 B2
(45) Date of Patent: Dec. 10, 2024

(54) TECHNOLOGIES FOR SELF-REFRESH DISPLAY POWER SAVING

(71) Applicant: Intel Corporation, Santa Clara, CA (US)

(72) Inventors: Krishna Kishore Nidamanuri, Bangalore (IN); Johnson Yeh, New Taipei (TW); Perazhi Sameer Kalathil, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 17/133,997

(22) Filed: Dec. 24, 2020

(65) Prior Publication Data

US 2021/0116988 A1 Apr. 22, 2021

(51) Int. Cl.
| | |
|---|---|
| *G06F 1/3234* | (2019.01) |
| *G06F 1/3218* | (2019.01) |
| *G09G 3/20* | (2006.01) |
| *G09G 3/36* | (2006.01) |
| *G09G 5/00* | (2006.01) |
| *G09G 5/18* | (2006.01) |

(52) U.S. Cl.
CPC .......... *G06F 1/3265* (2013.01); *G06F 1/3218* (2013.01); *G09G 3/2096* (2013.01); *G09G 3/3618* (2013.01); *G09G 5/006* (2013.01); *G09G 5/18* (2013.01); *G09G 2340/0435* (2013.01)

(58) Field of Classification Search
CPC .... G06F 1/3218; G06F 1/3265; G06F 1/3253; G09G 3/2096; G09G 3/3618; G09G 5/006; G09G 5/18; G09G 2330/021; G09G 2330/022; G09G 2340/0435
See application file for complete search history.

(56) References Cited

U.S. PATENT DOCUMENTS

| 9,047,085 | B2 | 6/2015 | Wyatt et al. | |
|---|---|---|---|---|
| 9,165,537 | B2 | 10/2015 | Wyatt et al. | |
| 11,328,687 | B2* | 5/2022 | Chen | G09G 5/10 |
| 2012/0207208 | A1 | 8/2012 | Wyatt et al. | |
| 2019/0051269 | A1* | 2/2019 | Kwa | G09G 5/12 |
| 2019/0172427 | A1* | 6/2019 | Saini | G09G 5/18 |

FOREIGN PATENT DOCUMENTS

EP 3547300 A1 10/2019

OTHER PUBLICATIONS

EPO; Extended European Search Report issued in EP Patent Application No. 21196809.4, dated Mar. 2, 2022; 20 pages.

* cited by examiner

*Primary Examiner* — Nelson M Rosario
(74) *Attorney, Agent, or Firm* — Alliance IP, LLC (57) ABSTRACT

Techniques for low-power self-refreshing of a display are disclosed. In the illustrative embodiment, a display receives frames as a base refresh rate, such as from a graphics processor. The graphics processor may determine that the last frame can be displayed for one or more additional frames and place the link to the display in a sleep state. The display can then refresh the last frame on the display. In order to save power, the display can refresh the last frame on the display at a reduced refresh rate, such as at the minimum refresh rate of the display.

25 Claims, 4 Drawing Sheets

TECHNOLOGIES FOR SELF-REFRESH DISPLAY POWER SAVING

BACKGROUND

A display of a compute device is an important user interface element. The image on a display may be updated frequently, such as when a user is watching a video. However, in other cases, the image on a display may be updated less frequently, such as when a user is reading a document. In such cases, the image does not need to be resent to the display. Rather, the display can continue to display the same image.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
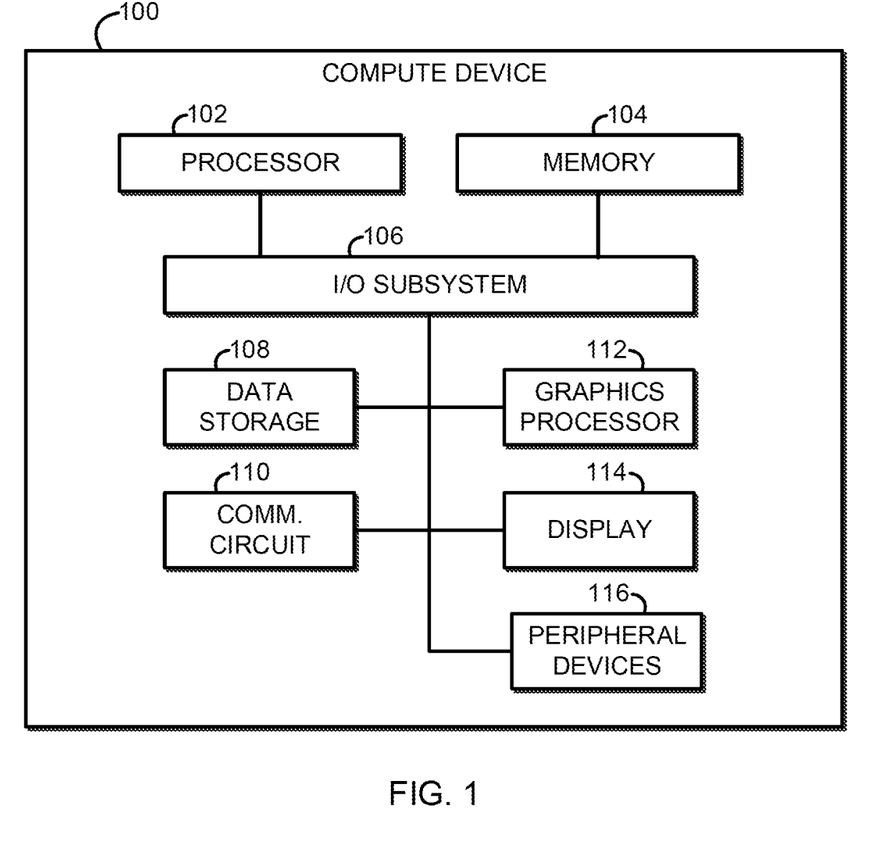
FIG. 1 is a simplified block diagram of at least one embodiment of a compute device for low power self-refreshing of a display.

Referring now to FIG. 1, an illustrative compute device 100 is configured to display frames on a display 114. The display 114 establishes a link with another component of the compute device 100, such as with a graphics processor 112. The display 114 receives images from the graphics processor 112 at a particular rate, such as 60 frames per second.

In certain cases, such as when a user is reading a document without scrolling, the compute device 100 determines that the same frame should be displayed multiple times. The graphics processor 112 may send an indication to the display 114 that the link between the graphics processor 112 and the display 114 will be put in a sleep state. The display 114 can be put into a self-refresh mode in which the display 114 will continue displaying the same frame. Initially, the display 114 may continue displaying the frame at the same frame rate, such as 60 frames per second. After a certain number of frames, such as 8 frames, the display 114 may change to a lower refresh rate, such as 20 frames per second, continuing to display the same frame. When the frame to be displayed changes, the graphics processor 112 may send a wake signal to the display 114 and continue sending frames at the initial rate of 60 frames per second. The display 114 can then continue displaying images at the initial rate of 60 frames per second.

It should be appreciated that reducing the frame rate can reduce the power used by the display 114. By reducing the refresh rate, the display 114 reduces the power used driving the voltage across pixels of the display 114, which can significantly reduce the power used by the display 114. For example, in one embodiment, the display 114 may use 480 milliwatts on driving circuitry (e.g., timing controller 206 and/or source driver 208 shown in FIG. 2) when the display 114 is at a refresh rate of 120 frames per second and may use 180 milliwatts on driving circuitry when the display 114 is reduced to a refresh rate of 20 frames per second in a self-refresh mode, a savings of 300 milliwatts. In another example, the display 114 may use 290 milliwatts on driving circuitry when the display 114 is at a refresh rate of 60 frames per second and may use 180 milliwatts on driving circuitry when the display 114 is at a refresh rate of 20 frames per second, a savings of 110 milliwatts.

The compute device 100 may be embodied as any type of compute device. For example, the compute device 100 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. The illustrative compute device 100 includes a processor 102, a memory 104, an input/output (I/O) subsystem 106, data storage 108, a communication circuit 110, a graphics processor 112, a display 114, and one or more peripheral devices 116. In some embodiments, one or more of the illustrative components of the compute device 100 may be incorporated in, or otherwise form a portion of, another component. For example, the memory 104, or portions thereof, may be incorporated in the processor 102 in some embodiments. In some embodiments, one or more of the illustrative components may be physically separated from another component.

The processor 102 may be embodied as any type of processor capable of performing the functions described herein. For example, the processor 102 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 104 may be embodied as any type of volatile or non-volatile memory or data storage capable of performing the functions described herein. In operation, the memory 104 may store various data and software used during operation of the compute device 100 such as operating systems, applications, programs, libraries, and drivers. The memory 104 is communicatively coupled to the processor 102 via the I/O subsystem 106, which may be embodied as circuitry and/or components to facilitate input/output operations with the processor 102, the memory 104, and other components of the compute device 100. For example, the I/O subsystem 106 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 106 may connect various internal and external components of the compute device 100 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 106 may form a portion of a system-on-a-chip (SoC) and be incorporated, along with the processor 102, the memory 104, and other components of the compute device 100 on a single integrated circuit chip.

The data storage 108 may be embodied as any type of device or devices configured for the short-term or long-term storage of data. For example, the data storage 108 may include any one or more memory devices and circuits, memory cards, hard disk drives, solid-state drives, or other data storage devices.

The communication circuit 110 may be embodied as any type of interface capable of interfacing the compute device 100 with other compute devices, such as over one or more wired or wireless connections. In some embodiments, the communication circuit 110 may be capable of interfacing with any appropriate cable type, such as an electrical cable or an optical cable. The communication circuit 110 may be configured to use any one or more communication technology and associated protocols (e.g., Ethernet, Bluetooth®, WiMAX, near field communication (NFC), etc.). The communication circuit 110 may be located on silicon separate from the processor 102, or the communication circuit 110 may be included in a multi-chip package with the processor 102, or even on the same die as the processor 102. The communication circuit 110 may be embodied as one or more add-in-boards, daughtercards, network interface cards, controller chips, chipsets, specialized components such as a field programmable gate array (FPGA) or application specific integrated circuit (ASIC), or other devices that may be used by the compute device 102 to connect with another compute device. In some embodiments, communication circuit 110 may be embodied as part of a system-on-a-chip (SoC) that includes one or more processors, or included on a multichip package that also contains one or more processors. In some embodiments, the communication circuit 110 may include a local processor (not shown) and/or a local memory (not shown) that are both local to the communication circuit 110. In such embodiments, the local processor of the communication circuit 110 may be capable of performing one or more of the functions of the processor 102 described herein. Additionally or alternatively, in such embodiments, the local memory of the communication circuit 110 may be integrated into one or more components of the compute device 102 at the board level, socket level, chip level, and/or other levels.

The graphics processor 112 is configured to perform graphics calculations, such as rendering graphics to be displayed on the display 114. Additionally or alternatively, in some embodiments, the graphics processor 112 may perform general computing tasks and/or may perform offload tasks that the graphics processor 112 is well-suited for, such as large parallel operations. The graphics processor 112 may be embodied as any type of processor capable of performing the functions described herein. For example, the graphics processor 112 may be embodied as a single or multi-core processor(s), a single or multi-socket processor, a digital signal processor, a microcontroller, or other processor or processing/controlling circuit.

The display 114 may be embodied as any type of display on which information may be displayed to a user of the compute device 100, such as a touchscreen display, a liquid crystal display (LCD), a thin film transistor LCD (TFT-LCD), a light emitting diode (LED) display, an organic light emitting diode (OLED) display, a cathode ray tube (CRT) display, a plasma display, an image projector (e.g., 2D or 3D), a laser projector, a heads-up display, and/or other display technology.

The illustrative display 114 may have a variable refresh rate, such as any refresh rate between 20 and 360 frames per second (i.e., between 20 and 360 Hertz), such as 20 Hz, 24 Hz, 25 Hz, 30 Hz, 40 Hz, 50 Hz, 60 Hz, 72 Hz, 120 Hz, 240 Hz, 360 Hz, etc. In some embodiments, such as embodiments with an OLED display, the refresh rate may be as low as 1 frame per second.

The display 114 may have any suitable resolution, such as 640×480, 1024×768, 1280×1024, 1920×1080, 3840×2160, 7680×4320, etc. The illustrative display 114 has three channels, one each for red, green, and blue. Each channel may be set to any 8-bit value (i.e., 0-255).

In some embodiments, the compute device 100 may include other or additional components, such as those commonly found in a compute device. For example, the compute device 100 may also have peripheral devices 116, such as a keyboard, a mouse, a speaker, a microphone, a camera, an external storage device, etc. In some embodiments, the compute device 100 may be connected to a dock that can interface with various devices, including peripheral devices 116.

Figure 2:
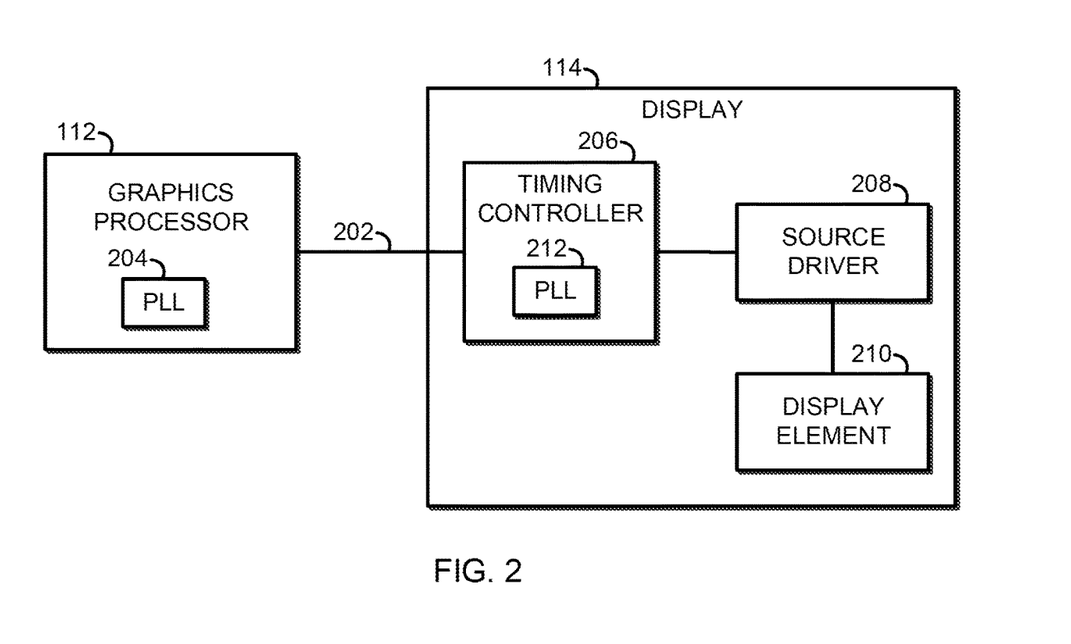
FIG. 2 is a simplified bloc diagram of at least one embodiment of a graphics processor and display of the compute device of FIG. 1.

Referring now to FIG. 2, in an illustrative embodiment, the graphics processor 112 is connected to the display 114 by an interconnect 202. The interconnect 202 may be embodied as, e.g., a cable including one or more wires, one or more electrical traces on a circuit board, one or more pins, or any other suitable interconnect. The interconnect 202 may contain, e.g., one or more wires for each of several lanes, one or more wires for an auxiliary channel, one or more wires for a hot plug detect, and/or one or more wires for other connector pins. In some embodiments, there may be a wireless connection in addition to or in place of a wired interconnect 202. In the illustrative embodiment, the graphics processor 112 and the display establish a link over the interconnect 202. The interconnect 202 may implement a connection between the display 114 and the graphics processor 112 using any suitable signal(s) or protocols, such as DisplayPort, Embedded DisplayPort (eDP), low voltage differential signaling (LVDS), flat panel display link (FPD-Link), internal display port (iDP), etc. The graphics processor 112 may use a local timing circuit, such as a phase locked loop (PLL) 204, to send signals to the display 114.

The display 114 includes a timing controller 206, a source driver, a display element 210, and a PLL 212. The timing controller 206 is configured to receive frames and other signals from the graphics processor 112. The timing controller 206 may store a frame received from the graphics processor 112 in a local frame buffer. In some embodiments, the timing controller 206 may have two buffers, one of which is used to receive a frame from the graphics processor 112, and one of which is used to send a frame to the source driver 208.

The source driver 208 is configured to receive a signal from the timing controller 206 to write a frame on the display element 210. The display element 210 may be embodied as any suitable display element, such as an array of pixels of liquid crystal cells. The source driver 208 may be embodied as, e.g., gate driver circuitry to activate a transistor to select a row (or column) of pixels, along with circuitry to apply a voltage to a column (or row) of pixels. In the illustrative embodiment, the transistor selects a single row (or column), and a voltage is applied to a single column (or row). As a result, only the pixel in the selected row and column is written to. The voltage applied may be controlled to select the amount of light to pass through the liquid crystal. For example, in the illustrative embodiment, the voltage may charge a capacitor, which causes a voltage across a liquid crystal. The voltage across the liquid crystal controls the amount of light that passes through the liquid crystal cell. In the illustrative embodiment, the source driver alternates voltage across each cell, such as each time the frame is refreshed. Such an alternating voltage may be required to prevent damage to the liquid crystal cell.

In the illustrative embodiment, the timing controller 206 receives a timing signal from the graphics processor 112 over the interconnect 202. When the link between the display 114 and the graphics processor 112 is in a sleep state, the timing controller 206 may use a local PLL 212 to control timing of the timing controller 206. When the link is placed into a wake state, the timing controller 206 can resynchronize to the signal from the graphics processor 112.

It should be appreciated that the embodiment shown in FIG. 2 is one possible embodiment, but other configurations are possible as well. For example, in some embodiments, the display 114 may connect to a component other than the graphics processor 112, such as to the I/O subsystem 106, the processor 102, a system-on-a-chip, etc. As another example, some or all of the components shown in the display 114 may not be included or may be included in other components. For example, in some embodiments, the timing controller 206 may include the source driver 208 and/or may not include the PLL 212.

Figure 3:
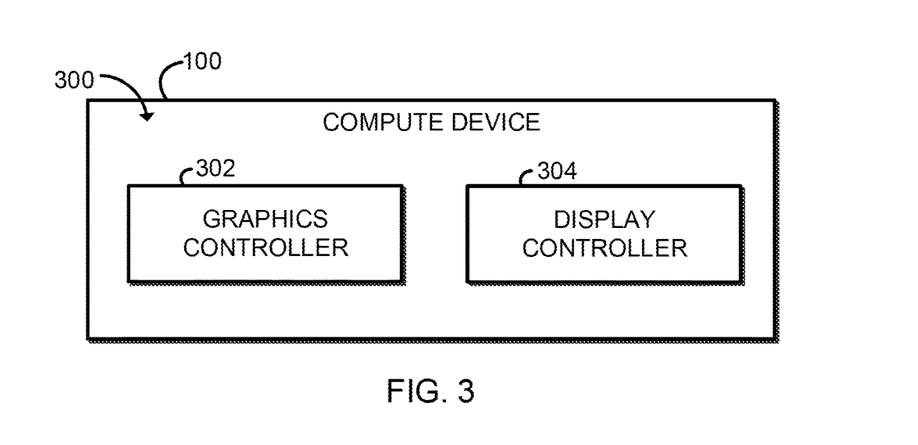
FIG. 3 is a simplified block diagram of at least one embodiment of an environment that may be established by the compute device of FIG. 1.

Referring now to FIG. 3, in an illustrative embodiment, the compute device 100 establishes an environment 300 during operation. The illustrative environment 300 includes a graphics controller 302 and a display controller 304. The various modules of the environment 300 may be embodied as hardware, software, firmware, or a combination thereof. For example, the various modules, logic, and other components of the environment 300 may form a portion of, or otherwise be established by, the processor 102 or other hardware components of the compute device 100 such as the memory 104, the data storage 108, etc. As such, in some embodiments, one or more of the modules of the environment 300 may be embodied as circuitry or collection of electrical devices (e.g., graphics controller circuitry 302, display controller circuitry 304, etc.). It should be appreciated that, in such embodiments, one or more of the circuits (e.g., the graphics controller circuitry 302, the display controller circuitry 304, etc.) may form a portion of one or more of the processor 102, the memory 104, the I/O subsystem 106, the data storage 108, the graphics processor 112, the display 114, and/or other components of the compute device 100. For example, in some embodiments, some or all of the modules may be embodied as the processor 102 as well as the memory 102 and/or data storage 108 storing instructions to be executed by the processor 102. For example, in the illustrative embodiment, the display controller 304 may include some or all of the timing controller 206 and the source driver 208. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 102 or other components of the compute device 100. It should be appreciated that some of the functionality of one or more of the modules of the environment 300 may require a hardware implementation, in which case embodiments of modules which implement such functionality will be embodied at least partially as hardware.

The graphics controller 302, which may be embodied as hardware, firmware, software, virtualized hardware, emulated architecture, and/or a combination thereof as discussed above, is configured to control the graphics processor 112 and/or other components that interface with the display 114. The graphics controller 302 may control parameters of the link with the display 114, such as a resolution and a base refresh rate. The graphics controller 302 may determine that the link to the display 114 should be placed in a sleep state, such as when the next frame to be displayed is the same as the last frame. The graphics controller 302 may determine that the link to the display 114 should be placed in a sleep state in any suitable manner, such as based on an active application, user input, a user profile, a power profile, etc. When the graphics controller 302 determines that new frames should be sent to the display 114 again, the graphics controller 302 can place the link back into a wake state.

In some embodiments, the graphics controller 302 may need to send one or a small number of frames to the display 114 while the link is in the sleep state. For example, a blinking cursor may be a periodic change in the frame that does not indicate that the frame is expected to change again soon. In such embodiments, the graphics controller 302 may send one or a small number of frames to the display 114 asynchronously, by placing the link back into a wake state.

The display controller 304, which may be embodied as hardware, firmware, software, virtualized hardware, emulated architecture, and/or a combination thereof as discussed above, is configured to control frames displayed on the display 114. The display controller 304 may determine parameters of the display 114, such as available resolutions, available refresh rates, a bit depth, available communication protocol, etc. The display controller 304 may send the parameters to another component of the compute device 100 to use for communication with the display 114.

The display controller 304 is configured to manage communication with a source device, such as a graphics processor 112. The display controller 304 may establish a link with the source device. As part of establishing a link, the display controller 304 may receive parameters for operation, such as a resolution and a base refresh rate, which is the refresh rate at which the source device will send frames to the display 114 when the link to the display 114 is active. It should be appreciated that the base refresh rate may be lower than a maximum refresh rate of the display 114 and may be higher than a minimum refresh rate of the display 114. The display controller 304 may also receive parameters related to how to operate when the link is in a sleep state, such as a number of frames to display before reducing the refresh rate or an indication of an active application running on the compute device 100. The display controller 304 may use the indication of the application that is active in determining how many frames to display at the base refresh rate when the display 114 is in the self-refresh mode.

When the link is active, the display controller 304 receives frames from the graphics processor 112 at the base refresh rate. In the illustrative embodiments, a frame may be sent as a packet, and sending the packet may not take the entire time between frames. For example, if the base refresh rate is 60 Hz (with a time between frames of approximately 16.7 milliseconds), the time required to transmit the image may be less than 16.7 milliseconds, such as 5 milliseconds. The display controller 304 may store the frame in a remote frame buffer and display the frame on the display 114.

The display controller 304 may receive an indication from the graphics processor 112 that the link is going to a sleep state, such as by receiving a sleep pattern from the graphics processor 112. When the link is in the sleep state, the display controller 304 may enter a self-refresh mode to continue refreshing the display 114 with the last frame received from the source device.

In the illustrative embodiment, when the display controller 304 initially enters the self-refresh mode, the display controller 304 continues displaying the last frame at the base refresh rate for a pre-determined number of frames. The pre-determined number of frames may be determined based on, e.g., a number sent by the source device, an indication of the active application of the compute device 100, etc. The pre-determined number of frames may be any number of frames, such as 0-100 frames. Once the display controller 304 has displayed the frame at the base refresh rate the pre-determined number of times, the display controller 304 switches to a reduced refresh rate. In the illustrative embodiment, the reduced refresh rate is a minimum refresh rate of the display 114, such as 20 Hz. It should be appreciated that, by reducing the refresh rate, the display controller 304 may reduce the power the display 114 uses. For example, the source driver 208 may be inactive between frames, reducing or eliminating power used by the source driver 208 for a large fraction of the time. It should be appreciated that waiting longer than the time between frames at the minimum refresh rate may damage the liquid crystal in a liquid crystal pixel. In other embodiments, the reduced refresh rate may be another rate between the base refresh rate and a minimum rate of the display 114.

In some cases, the graphics processor 112 may send one or more asynchronous frames to the display 114 by waking up the link. The asynchronous frames may be sent when there is a small number of new frames to send, such as caused by a blinking of a cursor. In the illustrative embodiment, the display controller 304 does not reset the number of times the last frame has been sent to the source driver 208 upon receipt of an asynchronous frame in block 430. Rather, the display controller 304 may continue using a reduced refresh rate. In other embodiments, the display controller 304 does reset the number of times the last frame has been sent to the source driver 208 upon receipt of an asynchronous frame. It should be appreciated that the asynchronous frame may be received at any time in the self-refresh mode, such as when the display controller 304 is writing a frame to the display element 210 or during the time between writing frames.

When the graphics processor 112 is ready to wake the link, it sends an indication to the display controller 304, such as by sending a wake pattern over an auxiliary channel. It should be appreciated that the display controller 304 may receive an indication to exit the self-refresh mode at any time, such as when the display controller 304 is writing a frame to the display element 210 or during the time between sending frames. As such, the display controller 304 may need to complete the current frame refresh simultaneously with receipt of the next frame. The display controller 304 may write the next frame as soon as possible, such as at the maximum refresh rate. In some embodiments, the display controller 304 may drop a frame if a frame is received while a frame is being sent to the source driver 208. After the link is placed in the wake state, the display controller 304 resynchronizes its internal timing generator to that of the source device, such as by recovering a clock signal from the link. Once the link is back in the wake state, the display controller 304 can receive the next frame and continue displaying frames at the base refresh rate.

Figure 4:
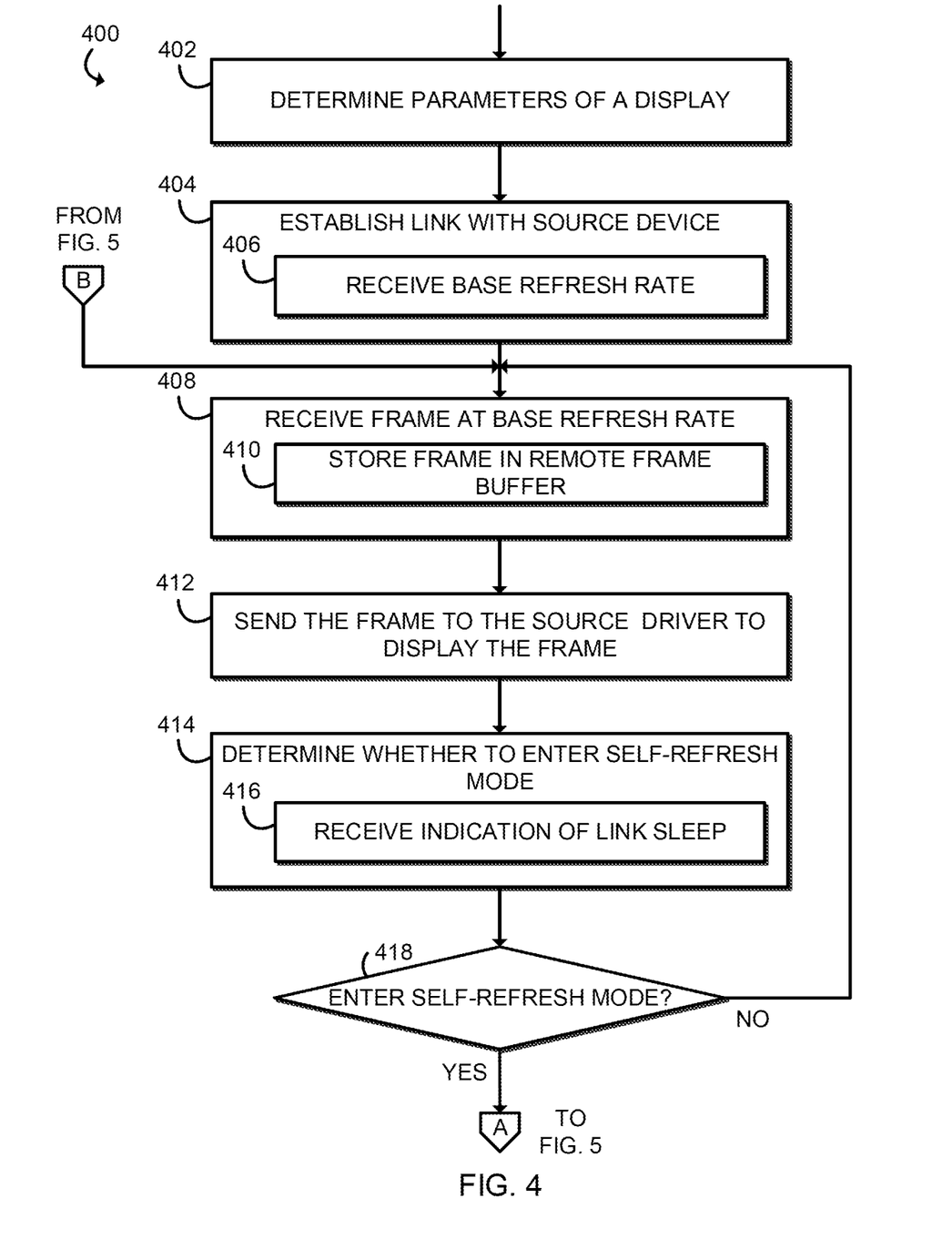
FIGS. 4-5 are a simplified flow diagram of at least one embodiment of a method for low power self-refreshing that may be executed by the display of FIG. 1.

Referring now to FIG. 4, in use, the compute device 100 may execute a method 400 for low power self-refreshing of a display. In the illustrative embodiment, some or all of the method 400 may be performed by the display 114 or components of the display, such as the display controller 304, the timing controller 206, and/or the source driver 208. The method 400 begins in block 402, in which the compute device 100 determines parameters of a display 114. The compute device 100 may determine, e.g., available resolutions, available refresh rates, a bit depth, available communication protocol, etc.

In block 404, the display 114 establishes a link with a source device, such as the graphics processor 112. As part of establishing a link, the display 114 may receive parameters for operation, such as a resolution. In block 406, the display 114 receives a base refresh rate, which is the refresh rate at which the source device will send frames to the display 114 when the link to the display 114 is active. It should be appreciated that the base refresh rate may be lower than a maximum refresh rate of the display 114 and may be higher than a minimum refresh rate of the display 114. The display 114 may also receive parameters related to how to operate when the link is in a sleep state, such as a number of frames to display before reducing the refresh rate or an indication of an application running on the compute device 100.

In block 408, the display 114 receives a frame from the graphics processor 112 at the base refresh rate. In the illustrative embodiments, a frame may be sent as a packet, and sending the packet may not take the entire time between frames. For example, if the base refresh rate is 60 Hz (with a time between frames of approximately 16.7 milliseconds), the time required to transmit the image may be less than 16.7 milliseconds, such as 5 milliseconds. The display 114 may store the frame in a remote frame buffer in block 410. In block 412, the display 114 may send the frame to the source driver 208 to display the frame.

In block 414, the display 114 determines whether to enter a self-refresh mode. In the illustrative embodiment, the display 114 determines that it should enter a self-refresh mode by receiving an indication from the graphics processor 112 that the link is going to a sleep state, such as by receiving a sleep pattern from the graphics processor 112. In other embodiments, the display 114 may determine that it should enter a self-refresh mode by receiving any suitable signal or no signal at all.

In block 418, if the display 114 is not to enter a self-refresh mode, the method 400 loops back to block 308 to receive a frame at the base refresh rate. If the display 114 is to enter a self-refresh mode, the method 400 proceeds to block 420 in FIG. 5.

Figure 5:
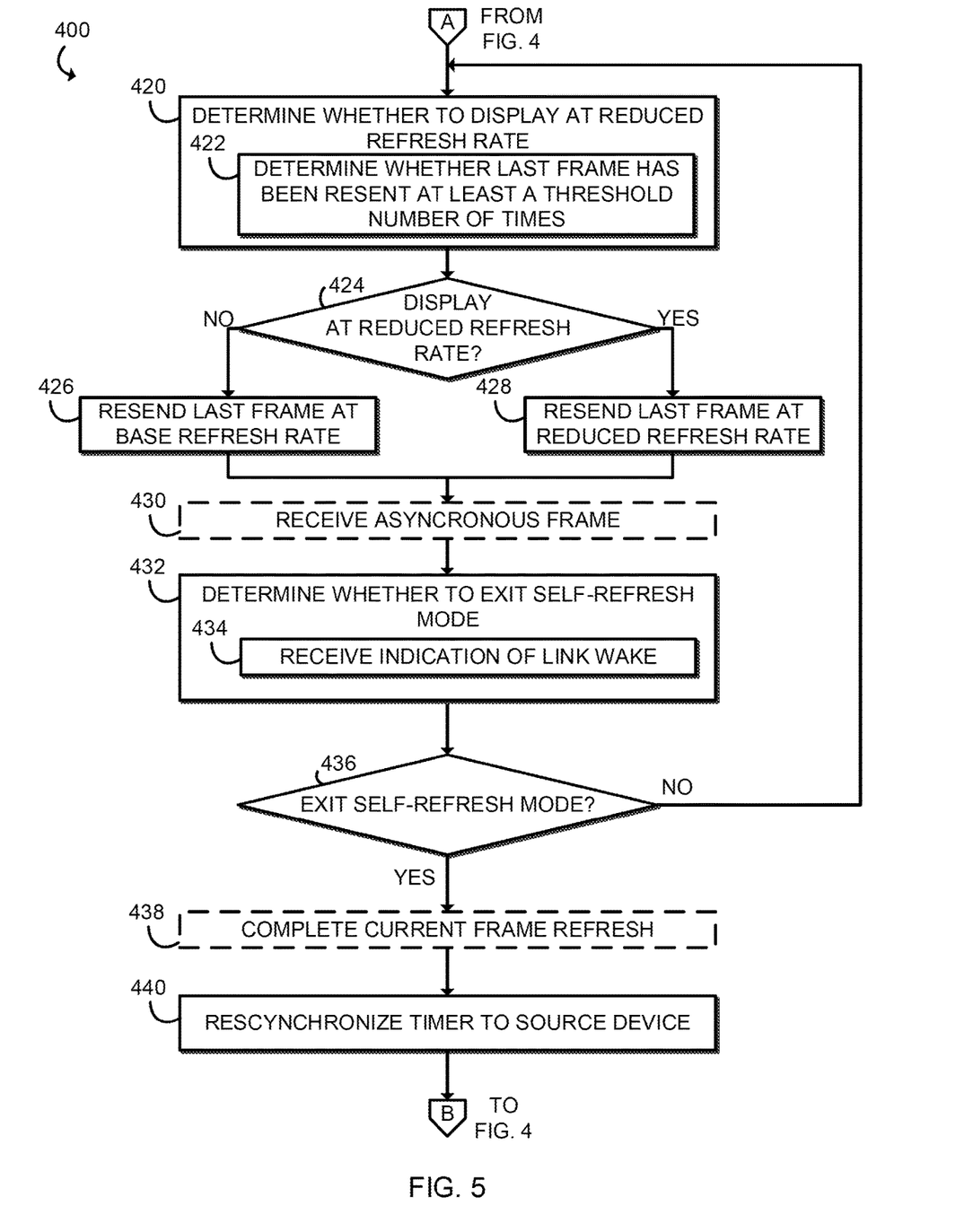

Referring now to FIG. 5, in block 420, the display 114 determines whether to display frames at a reduced refresh rate. In the illustrative embodiment, in block 422, the display 114 determines whether the last frame has been resent to the source driver 208 since the display 114 entered the self-refresh mode at least a threshold number of times, such as 8 times. The threshold may be any suitable value, such as any value between 0 and 100. If the last frame has been resent at least the threshold number of times, then the frame should be displayed at the reduced refresh rate. In some embodiments, the threshold may depend on the application of the compute device 100 that is currently being used. For example, a web browser may have a different threshold value than an application for viewing documents. The threshold may be determined by, e.g., the processor 102 based on the current application and then sent to the display 114, or the display 114 may determine the threshold based on an indication received from the compute device 100 of what application is currently active.

In block 424, if the display 114 is not to run at a reduced refresh rate, the method 400 proceeds to block 426 to resend the last frame to the source driver 208 at the base refresh rate. If the display 114 is to run at a reduced refresh rate, the method 400 proceeds to block 428 to resend the last frame to the source driver 208 at a reduced refresh rate. In the illustrative embodiment, the reduced refresh rate is a minimum refresh rate of the display 114, such as 20 Hz. It should be appreciated that, by reducing the refresh rate, the display 114 may reduce the power it uses. For example, the source driver 208 may be inactive between frames, reducing or eliminating power used by the source driver 208 for a large fraction of the time. It should be appreciated that waiting longer than the time between frames at the minimum refresh rate may damage the liquid crystal in a liquid crystal pixel. In other embodiments, the reduced refresh rate may be another rate between the base refresh rate and a minimum rate of the display 114.

After resending the last frame at either block 426 or block 428, the method 400 proceeds to optional block 430. In some cases, the graphics processor 112 may send one or more asynchronous frames to the display 114 by waking the link. The asynchronous frames may be sent when there is a small number of new frames to send, such as caused by a blinking of a cursor. In the illustrative embodiment, the display 114 does not reset the number of times the last frame has been sent to the source driver 208 that was referred to in block 422 upon receipt of an asynchronous frame in block 430. In other embodiments, the display 114 does reset the number of times the last frame has been sent to the source driver 208 upon receipt of an asynchronous frame. It should be appreciated that the asynchronous frame may be received at any time in the loop between block 420 and 436, such as when the display 114 is sending a frame in block 426 or 428 or during the time between sending frames.

In block 432, the display 114 determines whether to exit the self-refresh mode. The display 114 may determine to exit self-refresh mode by receiving an indication from the graphics processor 112 of a change of the link to a wake status, such as by receiving a wake pattern over an auxiliary channel or by receiving a new frame.

In block 436, if the display 114 is not to exit the self-refresh mode, the display 114 loops back to block 420 to determine whether the display at the reduced refresh rate. If the display 114 is to exit the self-refresh mode, the display 114 proceeds to optional block 438.

It should be appreciated that the display 114 may receive an indication to exit the self-refresh mode at any time, such as when sending the frame to the source driver 208 in block 428. As such, the display 114 may need to complete the current frame refresh in block 438 simultaneously with receipt of the next frame. The display 114 may write the next frame as soon as possible, such as at the maximum refresh rate. In some embodiments, the display 114 may drop a frame if a frame is received while a frame is being sent to the source driver 208.

In block 440, the display 114 resynchronizes its internal timing generator to that of the source device, such as by recovering a clock signal from the link. The method 400 then loops back to block 408 in FIG. 4 to receive the next frame.

EXAMPLES

Illustrative examples of the technologies disclosed herein are provided below. An embodiment of the technologies may include any one or more, and any combination of, the examples described below.

Example 1 includes an apparatus for displaying frames, the apparatus comprising display controller circuitry to establish, by a display controller, a link with a source device; receive an indication of a base refresh rate from the source device; receive a frame from the source device; send, based on the base refresh rate, the frame to a source driver to display the frame; determine whether to enter a self-refresh mode; resend, in response to a determination to enter the self-refresh mode, the frame to the source driver a plurality of times at a reduced refresh rate, wherein the reduced refresh rate is lower than the base refresh rate.

Example 2 includes the subject matter of Example 1, and wherein the display controller circuitry is further to resend, in response to the determination to enter the self-refresh mode, the frame to the source driver a plurality of times at the base refresh rate a pre-determined number of times prior to resending the frame the plurality of times at the reduced refresh rate.

Example 3 includes the subject matter of any of Examples 1 and 2, and wherein the display controller circuitry is further to receive the pre-determined number from the source device prior to entrance to the self-refresh mode.

Example 4 includes the subject matter of any of Examples 1-3, and wherein the display controller circuitry is further to receive an indication of an active application of a compute device comprising the source device; and determine the pre-determined number based on the active application.

Example 5 includes the subject matter of any of Examples 1-4, and wherein the display controller circuitry is further to receive an asynchronous frame in the self-refresh mode; and send the asynchronous frame to the source driver a plurality of times at the reduced refresh rate.

Example 6 includes the subject matter of any of Examples 1-5, and wherein the display controller circuitry is further to receive, from the source device, an indication to exit the self-refresh mode; receive a new frame after receipt of the indication to exit the self-refresh mode, wherein to receive the new frame comprising to receive the new frame simultaneously with resending the frame to the source driver a last time; and send the frame to the source driver after completion of resending the frame to the source driver the last time.

Example 7 includes the subject matter of any of Examples 1-6, and wherein to send the frame to the source driver to display the frame comprises to send the frame to the source driver at an average power use of the display controller of a first value, wherein to resend the frame to the source driver the plurality of times at the reduced refresh rate comprises to resend the frame to the source driver the plurality of times at the reduced refresh rate at an average power use of the display controller of a second value, wherein the first value is at least 100 milliwatts more than the second value.

Example 8 includes the subject matter of any of Examples 1-7, and wherein the first value is at least 200 milliwatts more than the first value.

Example 9 includes the subject matter of any of Examples 1-8, and wherein the reduced refresh rate is a minimum refresh rate of a display comprising the display controller.

Example 10 includes the subject matter of any of Examples 1-9, and wherein to determine whether to enter the self-refresh mode comprising to receive a sleep pattern over the link from the source device.

Example 11 includes the subject matter of any of Examples 1-10, and further including a display, the display comprising the display controller.

Example 12 includes the subject matter of any of Examples 1-11, and further including a processor; and a storage device communicatively coupled to the processor.

Example 13 includes the subject matter of any of Examples 1-12, and wherein the storage device comprises a plurality of instructions stored thereon that, when executed, causes the apparatus to determine an active application executing on the processor, wherein the display controller circuitry is further to resend, in response to the determination to enter the self-refresh mode and based on the active application, the frame to the source driver a plurality of times at the base refresh rate a pre-determined number of times prior to resending the frame the plurality of times at the reduced refresh rate.

Example 14 includes the subject matter of any of Examples 1-13, and wherein the plurality of instructions further causes the apparatus to determine the pre-determined number of times based on the active application; and send the pre-determined number to the display controller.

Example 15 includes the subject matter of any of Examples 1-14, and wherein the plurality of instructions further causes the apparatus to send an indication of the active application to the display controller, wherein the display controller is further to determine the pre-determined number of times based on the active application.

Example 16 includes a method for displaying frames, the method comprising establishing, by a display controller, a link with a source device; receiving, by the display controller, an indication of a base refresh rate from the source device; receiving, by the display controller, a frame from the source device; sending, by the display controller and based on the base refresh rate, the frame to a source driver to display the frame; determining, by the display controller, whether to enter a self-refresh mode; resending, by the display controller and in response to a determination to enter the self-refresh mode, the frame to the source driver a plurality of times at a reduced refresh rate, wherein the reduced refresh rate is lower than the base refresh rate.

Example 17 includes the subject matter of Example 16, and further including resending, by the display controller and in response to the determination to enter the self-refresh mode, the frame to the source driver a plurality of times at the base refresh rate a pre-determined number of times prior to resending the frame the plurality of times at the reduced refresh rate.

Example 18 includes the subject matter of any of Examples 16 and 17, and further including receiving, by the display controller, the pre-determined number from the source device prior to entrance to the self-refresh mode.

Example 19 includes the subject matter of any of Examples 16-18, and further including receiving, by the display controller, an indication of an active application of a compute device comprising the source device; and determining, by the display controller, the pre-determined number based on the active application.

Example 20 includes the subject matter of any of Examples 16-19, and further including receiving, by the display controller, an asynchronous frame in the self-refresh mode; and sending, by the display controller, the asynchronous frame to the source driver a plurality of times at the reduced refresh rate.

Example 21 includes the subject matter of any of Examples 16-20, and further including receiving, by the display controller and from the source device, an indication to exit the self-refresh mode; receiving, by the display controller, a new frame after receipt of the indication to exit the self-refresh mode, wherein receiving the new frame comprising receiving the new frame simultaneously with resending the frame to the source driver a last time; and sending, by the display controller, the frame to the source driver after completion of resending the frame to the source driver the last time.

Example 22 includes the subject matter of any of Examples 16-21, and wherein sending, by the display controller, the frame to the source driver to display the frame comprises sending the frame to the source driver at an average power use of the display controller of a first value, wherein resending, by the display controller, the frame to the source driver the plurality of times at the reduced refresh rate comprises resending, by the display controller, the frame to the source driver the plurality of times at the reduced refresh rate at an average power use of the display controller of a second value, wherein the first value is at least 100 milliwatts more than the second value.

Example 23 includes the subject matter of any of Examples 16-22, and wherein the first value is at least 200 milliwatts more than the first value.

Example 24 includes the subject matter of any of Examples 16-23, and wherein the reduced refresh rate is a minimum refresh rate of a display comprising the display controller.

Example 25 includes the subject matter of any of Examples 16-24, and wherein determining whether to enter the self-refresh mode comprising receiving a sleep pattern over the link from the source device.

Example 26 includes an apparatus for displaying frames, the apparatus comprising means for establishing, by a display controller, a link with a source device; means for receiving, by the display controller, an indication of a base refresh rate from the source device; means for receiving, by the display controller, a frame from the source device; means for sending, by the display controller and based on the base refresh rate, the frame to a source driver to display the frame; means for determining, by the display controller, whether to enter a self-refresh mode; means for resending, by the display controller and in response to a determination to enter the self-refresh mode, the frame to the source driver a plurality of times at a reduced refresh rate, wherein the reduced refresh rate is lower than the base refresh rate.

Example 27 includes the subject matter of Example 26, and further including means for resending, by the display controller and in response to the determination to enter the self-refresh mode, the frame to the source driver a plurality of times at the base refresh rate a pre-determined number of times prior to resending the frame the plurality of times at the reduced refresh rate.

Example 28 includes the subject matter of any of Examples 26 and 27, and further including means for receiving, by the display controller, the pre-determined number from the source device prior to entrance to the self-refresh mode.

Example 29 includes the subject matter of any of Examples 26-28, and further including means for receiving, by the display controller, an indication of an active application of a compute device comprising the source device; and means for determining, by the display controller, the pre-determined number based on the active application.

Example 30 includes the subject matter of any of Examples 26-29, and further including means for receiving, by the display controller, an asynchronous frame in the self-refresh mode; and means for sending, by the display controller, the asynchronous frame to the source driver a plurality of times at the reduced refresh rate.

Example 31 includes the subject matter of any of Examples 26-30, and further including means for receiving, by the display controller and from the source device, an indication to exit the self-refresh mode; means for receiving, by the display controller, a new frame after receipt of the indication to exit the self-refresh mode, wherein the means for receiving the new frame comprising means for receiving the new frame simultaneously with resending the frame to the source driver a last time; and means for sending, by the display controller, the frame to the source driver after completion of resending the frame to the source driver the last time.

Example 32 includes the subject matter of any of Examples 26-31, and wherein the means for sending, by the display controller, the frame to the source driver to display the frame comprises means for sending the frame to the source driver at an average power use of the display controller of a first value, wherein the means for resending, by the display controller, the frame to the source driver the plurality of times at the reduced refresh rate comprises means for resending, by the display controller, the frame to the source driver the plurality of times at the reduced refresh rate at an average power use of the display controller of a second value, wherein the first value is at least 100 milliwatts more than the second value.

Example 33 includes the subject matter of any of Examples 26-32, and wherein the first value is at least 200 milliwatts more than the first value.

Example 34 includes the subject matter of any of Examples 26-33, and wherein the reduced refresh rate is a minimum refresh rate of a display comprising the display controller.

Example 35 includes the subject matter of any of Examples 26-34, and wherein the means for determining whether to enter the self-refresh mode comprising means for receiving a sleep pattern over the link from the source device.

The invention claimed is:

1. An apparatus for displaying frames, the apparatus comprising:
    display controller circuitry to:
        establish a link with a source device;
        receive an indication of a base refresh rate from the source device;
        receive a frame from the source device;
        send, based on the base refresh rate, the frame to a source driver to display the frame;
        determine whether to enter a self-refresh mode;
        resend, in response to a determination to enter the self-refresh mode, the frame to the source driver a pre-determined number of times at the base refresh rate; and
        resend, after resending the frame the pre-determined number of times at the base refresh rate, the frame to the source driver a plurality of times at a reduced refresh rate, wherein the reduced refresh rate is lower than the base refresh rate.

2. The apparatus of claim 1, wherein the display controller circuitry is further to receive the pre-determined number from the source device prior to entrance to the self-refresh mode.

3. The apparatus of claim 1, wherein the display controller circuitry is further to:
    receive an indication of an active application of a compute device comprising the source device; and
    determine the pre-determined number based on the active application.

4. The apparatus of claim 1, wherein the display controller circuitry is further to:
    receive an asynchronous frame in the self-refresh mode; and
    send the asynchronous frame to the source driver a plurality of times at the reduced refresh rate.

5. The apparatus of claim 1, wherein the display controller circuitry is further to:
    receive, from the source device, an indication to exit the self-refresh mode;
    receive a new frame after receipt of the indication to exit the self-refresh mode, wherein to receive the new frame comprising to receive the new frame simultaneously with resending the frame to the source driver a last time; and
    send the frame to the source driver after completion of resending the frame to the source driver the last time.

6. The apparatus of claim 1, wherein to send the frame to the source driver to display the frame comprises to send the frame to the source driver at an average power use of the display controller circuitry of a first value, wherein to resend the frame to the source driver the plurality of times at the reduced refresh rate comprises to resend the frame to the source driver the plurality of times at the reduced refresh rate at an average power use of the display controller circuitry of a second value, wherein the first value is at least 100 milliwatts more than the second value.

7. The apparatus of claim 6, wherein the first value is at least 200 milliwatts more than the first value.

8. The apparatus of claim 1, wherein the reduced refresh rate is a minimum refresh rate of a display comprising the display controller circuitry.

9. The apparatus of claim 1, wherein to determine whether to enter the self-refresh mode comprising to receive a sleep pattern over the link from the source device.

10. The apparatus of claim 1, further comprising a display, the display comprising the display controller circuitry.

11. The apparatus of claim 10, further comprising:
a processor; and
a storage device communicatively coupled to the processor.

12. The apparatus of claim 11, wherein the storage device comprises a plurality of instructions stored thereon that, when executed, causes the apparatus to determine an active application executing on the processor,
wherein the display controller circuitry is further to resend, in response to the determination to enter the self-refresh mode and based on the active application, the frame to the source driver a plurality of times at the base refresh rate a pre-determined number of times prior to resending the frame the plurality of times at the reduced refresh rate.

13. The apparatus of claim 12, wherein the plurality of instructions further causes the apparatus to:
determine the pre-determined number of times based on the active application; and
send the pre-determined number to the display controller circuitry.

14. The apparatus of claim 12, wherein the plurality of instructions further causes the apparatus to send an indication of the active application to the display controller circuitry,
wherein the display controller circuitry is further to determine the pre-determined number of times based on the active application.

15. The apparatus of claim 1, wherein the pre-determined number of times to send the frame at the base refresh rate before sending the frame at the reduced refresh rate is at least three.

16. A method for displaying frames, the method comprising:
establishing, by a display controller, a link with a source device;
receiving, by the display controller, an indication of a base refresh rate from the source device;
receiving, by the display controller, a frame from the source device;
sending, by the display controller and based on the base refresh rate, the frame to a source driver to display the frame;
determining, by the display controller, whether to enter a self-refresh mode;
resending, in response to a determination to enter the self-refresh mode, the frame to the source driver a pre-determined number of times at the base refresh rate; and
resending, by the display controller and after resending the frame the pre-determined number of times at the base refresh rate, the frame to the source driver a plurality of times at a reduced refresh rate, wherein the reduced refresh rate is lower than the base refresh rate.

17. The method of claim 16, further comprising receiving, by the display controller, the pre-determined number from the source device prior to entrance to the self-refresh mode.

18. The method of claim 16, further comprising:
receiving, by the display controller, an indication of an active application of a compute device comprising the source device; and
determining, by the display controller, the pre-determined number based on the active application.

19. The method of claim 16, further comprising:
receiving, by the display controller, an asynchronous frame in the self-refresh mode; and
sending, by the display controller, the asynchronous frame to the source driver a plurality of times at the reduced refresh rate.

20. The method of claim 16, further comprising:
receiving, by the display controller and from the source device, an indication to exit the self-refresh mode;
receiving, by the display controller, a new frame after receipt of the indication to exit the self-refresh mode, wherein receiving the new frame comprises receiving the new frame simultaneously with resending the frame to the source driver a last time; and
sending, by the display controller, the frame to the source driver after completion of resending the frame to the source driver the last time.

21. The method of claim 16, wherein sending, by the display controller, the frame to the source driver to display the frame comprises sending the frame to the source driver at an average power use of the display controller of a first value,
wherein resending, by the display controller, the frame to the source driver the plurality of times at the reduced refresh rate comprises resending, by the display controller, the frame to the source driver the plurality of times at the reduced refresh rate at an average power use of the display controller of a second value,
wherein the first value is at least 100 milliwatts more than the second value.

22. The method of claim 21, wherein the first value is at least 200 milliwatts more than the first value.

23. The method of claim 16, wherein the reduced refresh rate is a minimum refresh rate of a display comprising the display controller.

24. The method of claim 16, wherein determining whether to enter the self-refresh mode comprises receiving a sleep pattern over the link from the source device.

25. The method of claim 16, wherein the pre-determined number of times the frame is sent at the base refresh rate before sending the frame at the reduced refresh rate is at least three.

* * * * *